United States Patent
Tomioka

(10) Patent No.: US 10,220,778 B2
(45) Date of Patent: Mar. 5, 2019

(54) VEHICLE-MOUNTED ALERT SYSTEM AND ALERT CONTROL DEVICE

(71) Applicant: DENSO CORPORATION, Kariya, Aichi-pref. (JP)

(72) Inventor: Shun Tomioka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/517,716

(22) PCT Filed: Oct. 16, 2015

(86) PCT No.: PCT/JP2015/005222
§ 371 (c)(1),
(2) Date: Apr. 7, 2017

(87) PCT Pub. No.: WO2016/067544
PCT Pub. Date: May 6, 2016

(65) Prior Publication Data
US 2017/0305342 A1    Oct. 26, 2017

(30) Foreign Application Priority Data
Oct. 29, 2014   (JP) ................. 2014-220640

(51) Int. Cl.
*G09G 5/00* (2006.01)
*B60Q 9/00* (2006.01)
(Continued)

(52) U.S. Cl.
CPC ............. *B60Q 9/008* (2013.01); *B60K 35/00* (2013.01); *B60K 37/06* (2013.01); *B60R 1/00* (2013.01); *B60R 1/12* (2013.01); *G06F 3/013* (2013.01); *G06F 3/1423* (2013.01); *G06F 3/1454* (2013.01); *G08G 1/16* (2013.01);
(Continued)

(58) Field of Classification Search
CPC ..................................................... G06F 3/013
See application file for complete search history.

(56) References Cited

U.S. PATENT DOCUMENTS

2011/0128139 A1* 6/2011 Tauchi .................. B60K 35/00
340/439
2015/0015479 A1* 1/2015 Cho ........................ G06F 3/013
345/156

FOREIGN PATENT DOCUMENTS

JP   2002019491 A   1/2002
JP   2012113672 A   6/2012

* cited by examiner

*Primary Examiner* — Nan-Ying Yang
(74) *Attorney, Agent, or Firm* — Harness, Dickey & Pierce, P.L.C.

(57) ABSTRACT

A vehicle-mounted alert system includes display devices equipped to a vehicle, a sight line detection device detecting driver's sight line, a surrounding monitoring device detecting a presence of an object near the vehicle and a direction of the object with respect to the vehicle, and an alert control device controlling the display devices to display an alert image for informing the driver of the presence of the object detected by the surrounding monitoring device. The alert control device controls the display device located in a direction of the sight line of the driver to display the alert image, and then, controls the display devices so that the alert image successively moves from the display device located in the direction of the sight line of the driver to the display device determined based on the direction of the object detected by the surrounding monitoring device.

11 Claims, 7 Drawing Sheets

(51) Int. Cl.
*B60R 1/00* (2006.01)
*G08G 1/16* (2006.01)
*B60R 1/12* (2006.01)
*G06F 3/01* (2006.01)
*G06F 3/14* (2006.01)
*B60K 35/00* (2006.01)
*B60K 37/06* (2006.01)
*G06K 9/00* (2006.01)

(52) U.S. Cl.
CPC ........ G08G 1/166 (2013.01); *B60K 2350/106* (2013.01); *B60K 2350/1072* (2013.01); *B60K 2350/1076* (2013.01); *B60K 2350/2013* (2013.01); *B60K 2350/352* (2013.01); *B60K 2350/924* (2013.01); *B60K 2350/927* (2013.01); *B60K 2350/965* (2013.01); *B60R 2001/1215* (2013.01); *B60R 2001/1284* (2013.01); *B60R 2300/105* (2013.01); *B60R 2300/205* (2013.01); *B60R 2300/303* (2013.01); *B60R 2300/8006* (2013.01); *B60R 2300/8093* (2013.01); *G06K 9/00805* (2013.01)

VEHICLE-MOUNTED ALERT SYSTEM AND ALERT CONTROL DEVICE

CROSS REFERENCE TO RELATED APPLICATIONS

This application is a U.S. National Phase Application under 35 U.S.C. 371 of International Application No. PCT/JP2015/005222 filed on Oct. 16, 2015 and published in Japanese as WO 2016/067544 A1 on May 6, 2016. This application is based on and claims the benefit of priority from Japanese Patent Application No. 2014-220640 filed on Oct. 29, 2014. The entire disclosures of all of the above applications are incorporated herein by reference.

TECHNICAL FIELD

The present disclosure relates to a vehicle-mounted alert system having multiple display devices and an alert control device provided in the vehicle-mounted alert system.

BACKGROUND ART

A device for displaying multiple images obtained by imaging a situation outside of a vehicle at a position visible from a driver's seat of the vehicle has been known. For example, in Patent Literature 1, a right front image, a right rear image, a left front image, and a left rear image are displayed on a horizontally elongated display device extending from a front of the driver's seat to a front of a passenger's seat in a vehicle compartment. An instrument image is also displayed on the display device.

In addition, in Patent Literature 1, any one of the right front image, the right rear image, the left front image, or the left rear image is selected as a target image to be recognized by a driver, and in order to let the driver recognize the determined image, a marker is moved from the instrument image to the target image to be recognized.

PRIOR ART LITERATURE

Patent Literature

Patent Literature 1: JP 2012-113672 A

SUMMARY OF INVENTION

Suppose that multiple pieces of information such as multiple images around the vehicle is displayed at multiple positions visible from the driver's seat. In this configuration when the information to be recognized by the driver is displayed at one of the multiple positions, it may take time for the driver to recognize the target information to be recognized from the multiple pieces information.

In Patent Literature 1, the marker is configured to move from the instrument image to the target image to be recognized. But the driver's attention is not always on the instrument image. For that reason, even when the marker is moved to the target image to be recognized by the driver from the instrument image as a reference position, the driver may fail to notice the movement of the marker promptly. As a result, a time required until the driver recognizes the target image becomes long sometimes.

The present disclosure has been made on the basis of the above circumstances, and it is an object of the present disclosure to provide a vehicle-mounted alert system and an alert control device both of which enable a driver to promptly recognize a target image required to be recognized by the driver.

According to an aspect of the present disclosure, a vehicle-mounted alert system includes display devices equipped to a vehicle, a sight line detection device detecting a sight line of a driver of the vehicle, a surrounding monitoring device detecting a presence of an object near the vehicle and a direction of the object with respect to the vehicle, and an alert control device controlling the display devices to display an alert image for informing the driver of the presence of the object detected by the surrounding monitoring device. The alert control device controls, among the display devices, the display device located in a direction of the sight line of the driver which is detected by the sight line detection device to display the alert image, and then, the alert control device controls the display devices so that the alert image successively moves from the display device located in the direction of the sight line of the driver to the display device determined based on the direction of the object detected by the surrounding monitoring device.

According to the above vehicle-mounted alert system, when the surrounding monitoring device informs the driver of the presence of the object detected near the vehicle, the alert control device controls the alert image to be displayed on the display device located in the sight line direction detected by the sight line detection device among the multiple display devices. Since the display device for displaying the alert image is located in the direction of the sight line of the driver, the driver can easily be aware of the alert image.

Furthermore, after the alert image is displayed on the display device located in the sight line direction of the driver, the alert control device successively moves the alert image to the display device determined on the basis of the direction of the object detected by the surrounding monitoring device. With the movement of the alert image, there is a high possibility that the sight line of the driver also moves in a direction along which the alert image moves. Therefore, the driver can promptly recognize the situation required to be recognized by the driver.

According to another aspect of the present disclosure, an alert control device which is used in a vehicle-mounted alert system includes an alert image creation unit and a processing result output unit. The vehicle-mounted alert system includes display devices equipped to a vehicle, a sight line detection device detecting a sight line of a driver of the vehicle, and a surrounding monitoring device detecting a presence of an object near the vehicle and a direction of the object with respect to the vehicle. The alert control device includes an alert image creation unit creating an alert image that informs the driver of the presence of the object detected by the surrounding monitoring device and a processing result output unit controlling the alert image to be displayed on the display devices. The processing result output unit controls, among the display devices, the display device located in a direction of the sight line of the driver which is detected by the sight line detection device to display the alert image, and then, the processing result output unit controls the display devices so that the alert image successively moves from the display device located in the direction of the sight line of the driver to the display device determined based on the direction of the object detected by the surrounding monitoring device.

Similarly, the alert control device can enable the driver to promptly recognize the target image which is required to be recognized by the driver.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

First Embodiment

Figure 1:
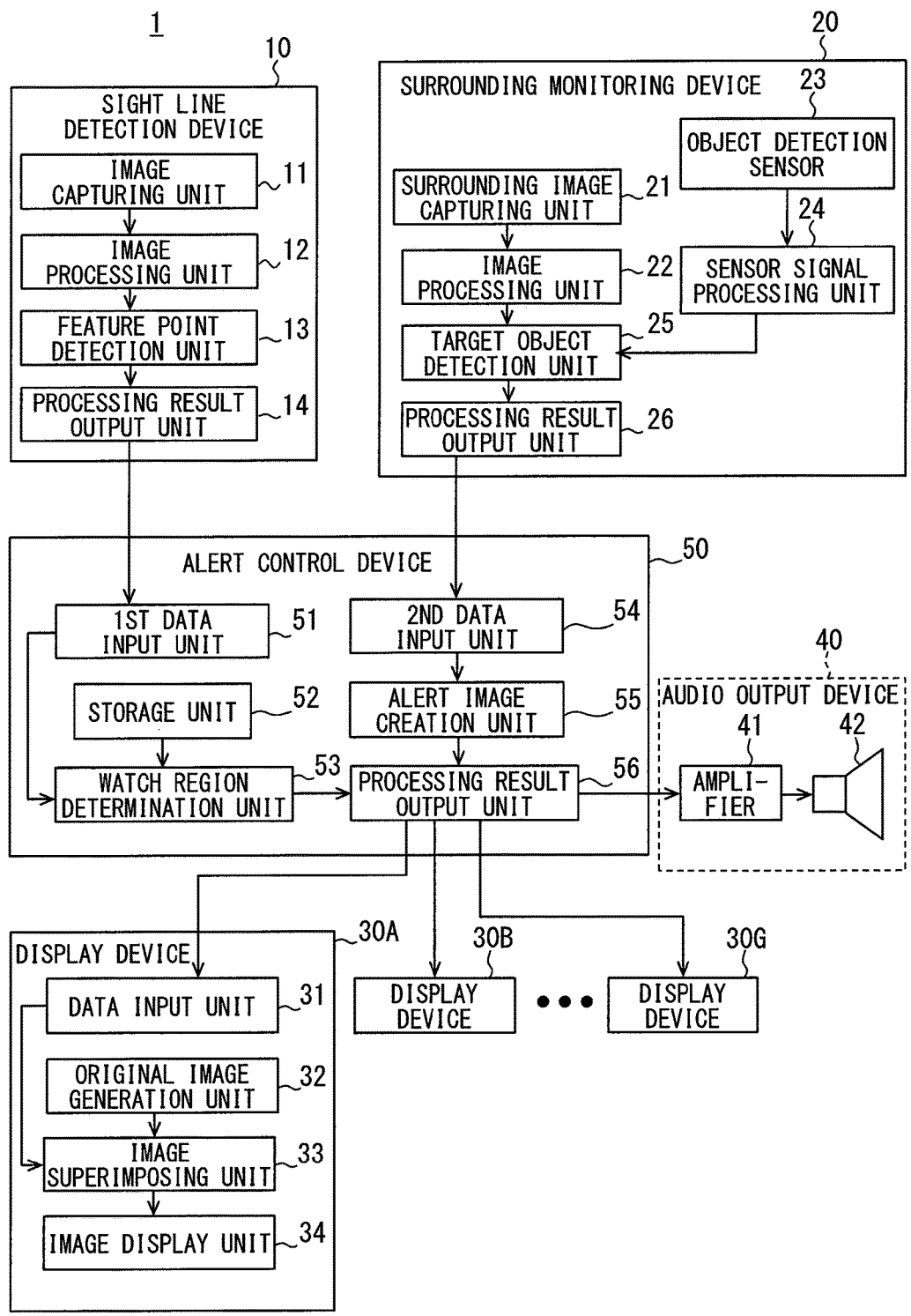
FIG. 1 is a diagram showing a configuration of a vehicle-mounted alert system according to a first embodiment of the present disclosure.

Hereinafter, embodiments of the present disclosure will be described with reference to the drawings. As illustrated in FIG. 1, a vehicle-mounted alert system 1 according to a first embodiment includes a sight line detection device 10, a surrounding monitoring device 20, display devices 30, an audio output device 40, and an alert control device 50. These components are mounted in the same vehicle. Hereinafter, the vehicle in which the vehicle-mounted alert system 1 is mounted is referred to as subject vehicle.

(Configuration of Sight Line Detection Device 10)

The sight line detection device 10 successively detects a sight line of the driver seated on a driver's seat. The sight line detection device 10 successively executes the sight line detection while a power supply is on state. The sight line detection device 10 includes an image capturing unit 11, an image processing unit 12, a feature point detection unit 13, and a processing result output unit 14.

The image capturing unit 11 is provided by a camera, and is attached at a position in the vehicle compartment so that a face of the driver seated on the driver's seat can be imaged. The image capturing unit 11 successively captures the image including the driver's face. The image capturing unit 11 then successively outputs, to the image processing unit 12, captured image signal representing a captured image.

The image processing unit 12 and the feature point detection unit 13 are achieved by software process executed by a microcomputer. Specifically, the microcomputer includes a CPU, a ROM, a RAM or the like, and the CPU executes a program stored in the ROM using a temporary storage of a RAM in order to provides the image processing unit 12 and the feature point detection unit 13. Alternatively, a part or all of the functions to be executed by the image processing unit 12 and the feature point detection unit 13 may also be configured by a single or multiple ICs in a hardware fashion.

The image processing unit 12 processes the captured image signal input from the image capturing unit 11 using a known image processing technique. Herein, the image processing is a preparation process for enabling the feature point detection unit 13 detects feature points. For example, the preparation process may be a binarization process.

The feature point detection unit 13 detects various feature points of the face from the image captured by the image capturing unit 11 with the use of the processed signal. Herein, the processed signal is the signal processed by the image processing unit 12. The feature point detection unit 13 detects, based on the features points of the face, a face region in the image, an orientation of the face, an eye region in the face region, eye inner corners, irises, the sight line relative to the orientation of the face, and the like. Further, the feature point detection unit 13 determines the sight line based on a fixed direction (for example, a front-back direction of the vehicle) in the vehicle compartment according to the orientation of the face and the sight line relative to the orientation of the face. Hereinafter, when simply referred to as the sight line, the sight line means the sight line relative to the fixed direction (for example, the front-back direction of the vehicle) in the vehicle compartment.

The processing result output unit 14 outputs a signal indicative of the sight line detected by the feature point detection unit 13. The output signal is input to a first data input unit 51 of the alert control device 50.

(Configuration of Surrounding Monitoring Device 20)

The surrounding monitoring device 20 includes a surrounding image capturing unit 21, an image processing unit 22, an object detection sensor 23, a sensor signal processing unit 24, a target object detection unit 25, and a processing result output unit 26.

The surrounding image capturing unit 21 captures an image (hereinafter referred to as "surrounding image") around the subject vehicle, and includes at least one camera. The camera is installed in the vehicle so that a periphery of the subject vehicle falls within an imaging area. Specific examples of the camera include a front camera that images a front area of the subject vehicle, a rear camera that images a rear area of the subject vehicle, a right side camera that images from an area on right side of the subject vehicle to a right rear area, and a left side camera that images from an area on left side of the subject vehicle to a left rear area. The surrounding image capturing unit 21 outputs a signal (hereinafter referred to as "surrounding image signal") indicative of a surrounding image captured by the camera to the image processing unit 22.

The image processing unit 22 performs a known image processing to the surrounding image signal acquired from the surrounding image capturing unit 21 for enabling detection of a target object. The image processing is, for example, edge detection processing. The image processing unit 22 outputs a signal that has been treated by the image processing to the target object detection unit 25.

The image processing unit 22 as well as the target object detection unit 25 to be described later is achieved by a software process executed by a computer which includes a CPU, a ROM, a RAM, and so on. Alternatively, a part or all of the functions to be executed by the image processing unit 22 and the target object detection unit 25 may be configured by a single or multiple ICs in a hardware fashion.

The object detection sensor 23 transmits a probe wave such as a laser light, a radio wave, or an ultrasonic wave as a transmission wave to a predetermined detection range, and receives a reflected wave generated by a reflection of the probe wave on an object present outside of the subject vehicle. The object detection sensor 23 outputs the received signal to the sensor signal processing unit 24.

The sensor signal processing unit 24 performs predetermined signal processing such as filter processing, amplification, and AD conversion to the signal acquired from the object detection sensor 23. The sensor signal processing unit 24 outputs the processed signal to the target object detection unit 25.

The target object detection unit 25 detects a target object of a predetermine type which is present around the subject vehicle with the use of the signal acquired from the image processing unit 22 and the signal acquired from the sensor signal processing unit 24. Also, the target object detection unit 25 detects a direction and a distance of the existing target object with the subject vehicle as a base point.

The target object of the predetermined type may include, for example, all of the moving objects. Alternatively, the target object of the predetermined type may include a part of moving objects, for example, a vehicle or a pedestrian. In addition, not only the moving objects but also stationary objects may also be set as the target object. In that case, all of the objects present on a road are set as target objects.

When a part of the objects present on the road is set as the target object, a known object recognition technique, for example, a SHIFT method or the like can be used to detect the target object with the use of the signal acquired from the image processing unit 22. In the object detection technique using the signal acquired from the sensor signal processing unit 24, for example, a received signal intensity may be compared with a predetermined detection threshold of an object in order to detect the object.

Furthermore, the target object detection unit 25 determines whether it is necessary to inform the driver of the presence of the detected target object, or not. In other words, the target object detection unit 25 determines whether to alert the driver to the detected target object, or not. In that determination, the target object detection unit 25 may use information on a change in the position of the subject vehicle such as a speed of the subject vehicle or a traveling direction of the subject vehicle in addition to the distance to the target object, the direction in which the target object is present relative to the subject vehicle.

When determining that it is necessary to inform the driver of the presence of the target object, the target object detection unit 25 generates a target object detection signal including information indicating that there is a need to pay attention to the target object, the direction in which the target object is present, and the distance to the target object. Then, the target object detection unit 25 outputs the target object detection signal to the processing result output unit 26. Hereinafter, the target object determined necessary to be notified to the driver is referred to as an alert target object.

The determination as to whether to alert the driver to the target object, or not, and the generation and output of the target object detection signal are performed periodically with a short cycle of 1 second or less. During a time period while the alert is determined to be carried out, the target object detection unit 25 successively generates the target object detection signal, and outputs the generated target object detection signal to the processing result output unit 26. When it is determined that the alert to the driver of the target object is no longer necessary, the generation and output of the target object detection signal are canceled.

The processing result output unit 26 outputs the target object detection signal acquired from the target object detection unit 25 to the alert control device 50. The target object detection signal output from the processing result output unit 26 is input to a second data input unit 54 of the alert control device 50.

(Configuration of Display Devices 30)

The vehicle-mounted alert system 1 includes multiple display devices 30A to 30G. As illustrated in FIG. 1, the display device 30A includes a data input unit 31, an original image generation unit 32, an image superimposing unit 33, and an image display unit 34. Similarly, the other display devices 30B to 30G each includes the data input unit 31, the original image generation unit 32, the image superimposing unit 33, and the image display unit 34. Hereinafter, when the multiple display devices 30A to 30G are not particularly distinguished from each other, those display devices are referred to as merely "display devices 30".

The data input unit 31 receives an alert image signal output from a processing result output unit 56 of the alert control device 50.

The original image generation unit 32 generates a signal indicative of an image (hereinafter referred to as "original image") to be displayed on the image display unit 34 when no alert image signal is acquired by the display devices 30A to 30G. The image superimposing unit 33 generates a superimposed image signal indicative of a superimposed image in which an alert image 60 (refer to FIG. 4) is superimposed on the original image, and outputs the superimposed image signal to the image display unit 34.

The image display unit 34 includes a display surface and a display panel that generates an image to be displayed on the display surface. When the superimposed image signal is input to the image display unit 34, the superimposed image is generated by the display panel, and the superimposed image is displayed on the display surface.

Figure 2:
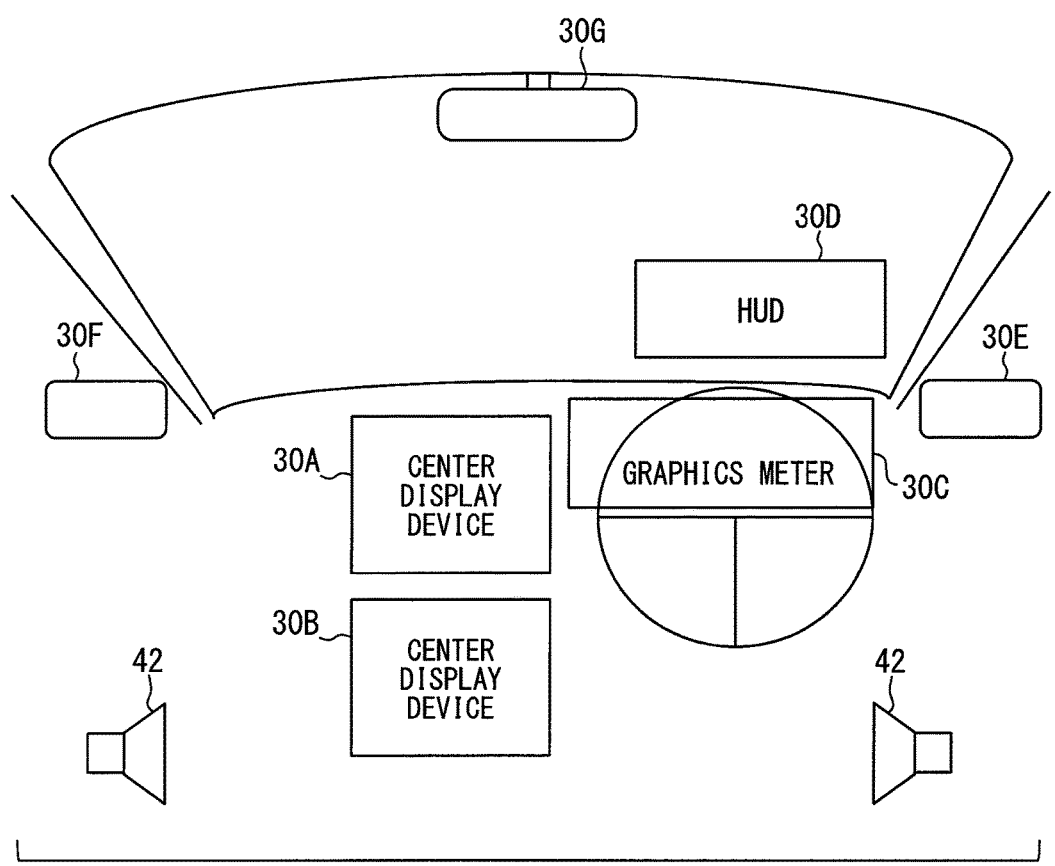
FIG. 2 is a diagram illustrating an arrangement of display devices used in the vehicle-mounted alert system.

FIG. 2 illustrates an arrangement example of the display devices 30A to 30G. Alternatively, the vehicle-mounted alert system 1 may include a part of the display devices 30A to 30G, or may include additional display devices 30 other than the display devices 30A to 30G.

In the example illustrated in FIG. 2, the display devices 30A and 30B are disposed at a central portion of a front end of the vehicle compartment in a vehicle width direction, and is referred to as "center displays". In addition, the display device 30A is disposed on an upper side of the display device 30B. The original images on those display devices 30A and 30B are, for example, a map image, an operation image of an audio device, and so on.

The display device 30C is disposed on a forward side of the driver's seat at the front end of the vehicle compartment, and is referred to as "graphics meter". The original image on the display device 30C is, for example, an image of various vehicle meters.

The display device 30D displays the image on a front windshield of the subject vehicle, and is referred to as "head-up display". In other words, a part of the front windshield provides a display surface of the display device 30D. In the example of FIG. 2, the display surface of the display device 30D is provided a lower portion of the front windshield in the front direction of the driver's seat. The original image on the display device 30D is, for example, a speed display image or a front image obtained by imaging the front area of the subject vehicle.

The display devices 30E and 30F are electronic side mirrors which are disposed at positions of normal actual side mirrors. The original image on the display device 30E is an image obtained by imaging an area extending from the right side of the subject vehicle to the right rear area of the subject vehicle, and the original image on the display device 30F is an image obtained by imaging an area extending from the left side of the subject vehicle to the left rear area of the subject vehicle.

The display device 30G is an electronic inner rearview mirror and is disposed at a position of a normal actual inner rearview mirror. The original image on the display device 30G is an image obtained by imaging a rear side of the subject vehicle.

(Configuration of Audio Output Device 40)

The description returns to FIG. 1. The audio output device 40 includes an amplifier 41 and a speaker 42. The amplifier 41 amplifies an audio signal that is an electric signal indicative of an audio operation guide output from the processing result output unit 56, and outputs the amplified audio signal to the speaker 42.

The speaker 42 is disposed at a position where a sound can be output toward the vehicle compartment, and converts the audio signal output from the amplifier 41 into the sound, and outputs the converted sound. In FIG. 1, only one speaker 42 is illustrated. Alternatively, multiple speakers 42 may be provided.

(Configuration of Alert Control Device 50)

The alert control device 50 is provided by a computer, and includes the first data input unit 51, a storage unit 52, a watch region determination unit 53, the second data input unit 54, an alert image creation unit 55, and the processing result output unit 56. Parts of the functions of the watch region determination unit 53, the alert image creation unit 55, and the processing result output unit 56 among those respective units are achieved by software processing program. Alternatively, a part or all of functions to be executed by the software processing program may be configured by a single or multiple ICs in a hardware configuration.

The first data input unit 51 receives a signal indicative of the sight line output from the processing result output unit 14 of the sight line detection device 10. Coordinate data indicative of respective display surface ranges of the multiple display devices 30 provided in the vehicle-mounted alert system 1 is stored in the storage unit 52.

The watch region determination unit 53 determines, among the display devices 30, which display device 30 is located in the sight line direction of the driver, that is, which display device 30 is located in the watching direction of the driver. The watch region determination unit 53 performs this determination on the basis of the sight line of the driver which is represented by the signal input to the first data input unit 51 and the coordinate data indicative of the display surface ranges of the display devices 30. As described above, the coordinate data indicative of the display surface ranges of the display devices 30 is stored in the storage unit 52. The watch region determination unit 53 outputs the signal indicative of the display device 30 located in the watching direction of the driver to the processing result output unit 56.

When the sight line of the driver intersects with the display surface of any display device 30, the display device 30, the display surface of which intersects with the sight line, is set as the display device 30 located in the watching direction of the driver. When the sight line of the driver does not intersect with the display surface of any display device 30, the display device 30, the display surface of which is located closest from the sight line, is set as the display devices 30 located in the watching direction of the driver. Alternatively, a front space of the driver may be divided into multiple sub-regions, and the display device 30 present in the same sub-area as that of the sight line of the driver may be set as the display device 30 located in the watching direction of the driver.

The second data input unit 54 receives a target object detection signal output from the processing result output unit 26 of the surrounding monitoring device 20.

When the target object detection signal is input to the second data input unit 54, the alert image creation unit 55 outputs the alert image signal to the processing result output unit 56 in order to display the alert image 60 on the display device 30.

The processing result output unit 56 includes an output port and outputs the alert image signal acquired from the alert image creation unit 55 to the display device 30 located in the watching direction of the driver. In addition, in order to output the audio operation guide from the speaker 42, the processing result output unit 56 outputs the audio signal indicative of the audio operation guide to the amplifier 41.

(Detailed Process Executed by Processing Result Output Unit 56)

Figure 3:
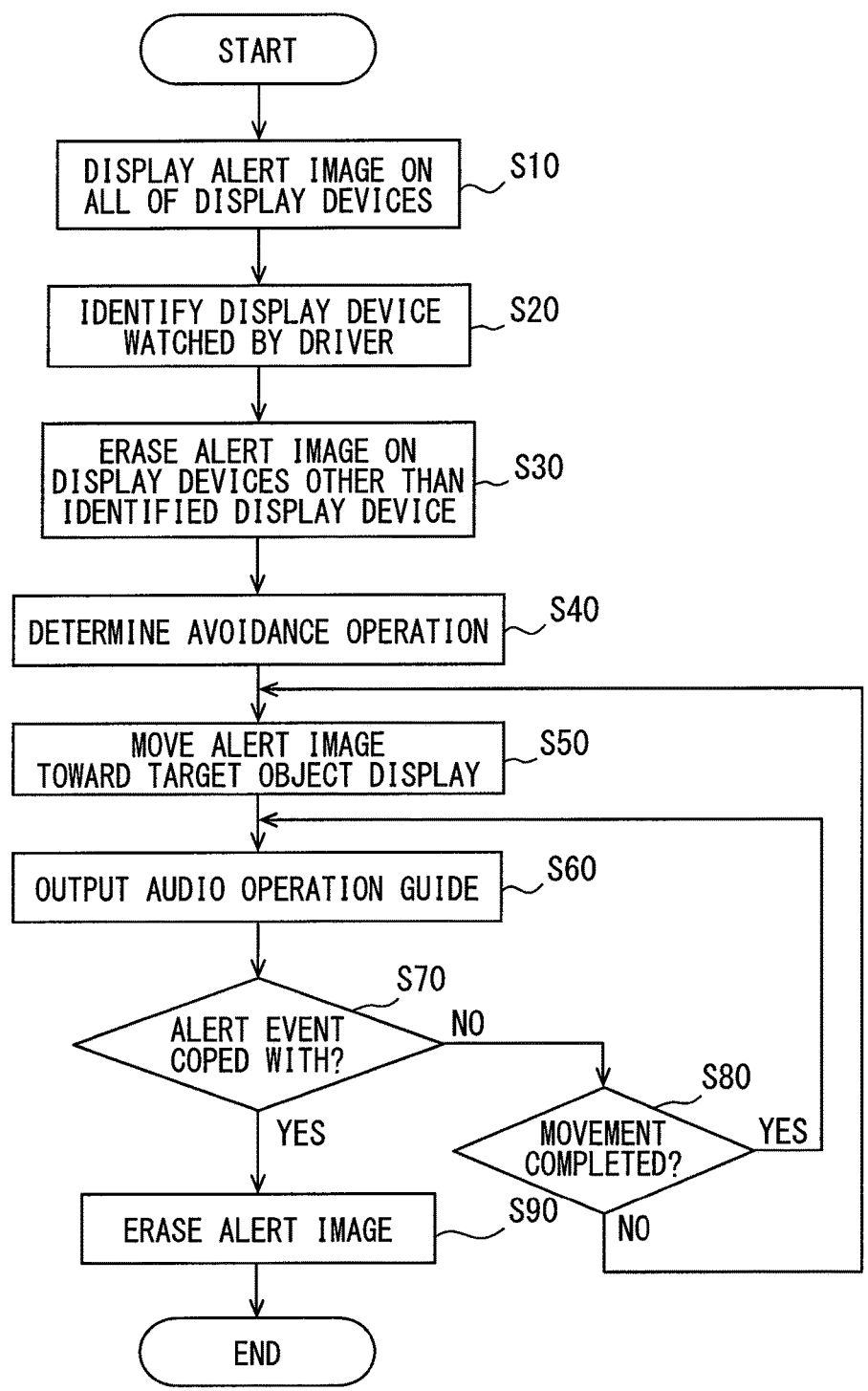
FIG. 3 is a flowchart illustrating a process executed by a result output unit of the alert control device in detail.

FIG. 3 is a flowchart illustrating the process executed by the processing result output unit 56 in detail. When the processing result output unit 56 acquires the alert image signal, the processing result output unit 56 starts the process illustrated in FIG. 3.

Figure 4:
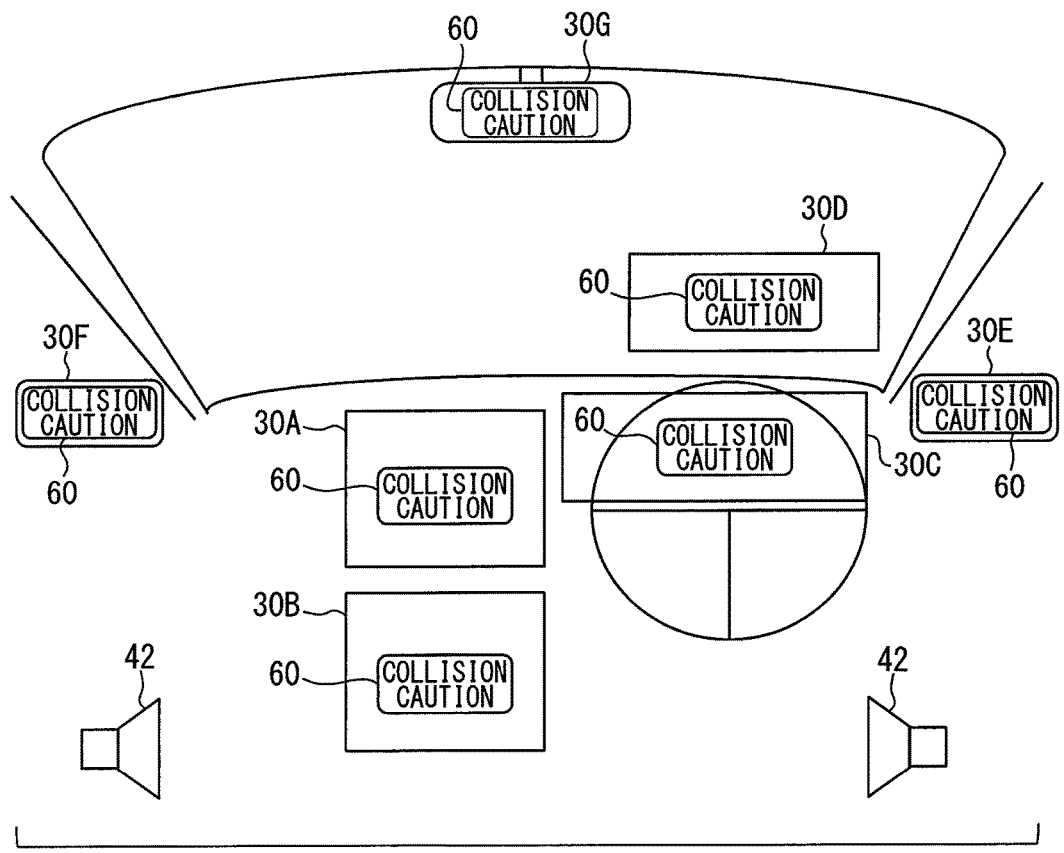
FIG. 4 is a diagram illustrating a display example of the display devices when executing step S10 in FIG. 3.

In step S10, the processing result output unit 56 displays the alert image 60 on all of the display devices 30A to 30G. More specifically, the alert image signals acquired from the alert image creation unit 55 are output to all of the display devices 30A to 30G. Upon execution of step S10, as illustrated in FIG. 4, the alert image 60 is displayed on all of the display devices 30A to 30G. Meanwhile, in the present embodiment, all of the display devices 30A to 30G correspond to the initial display devices.

Figure 5:
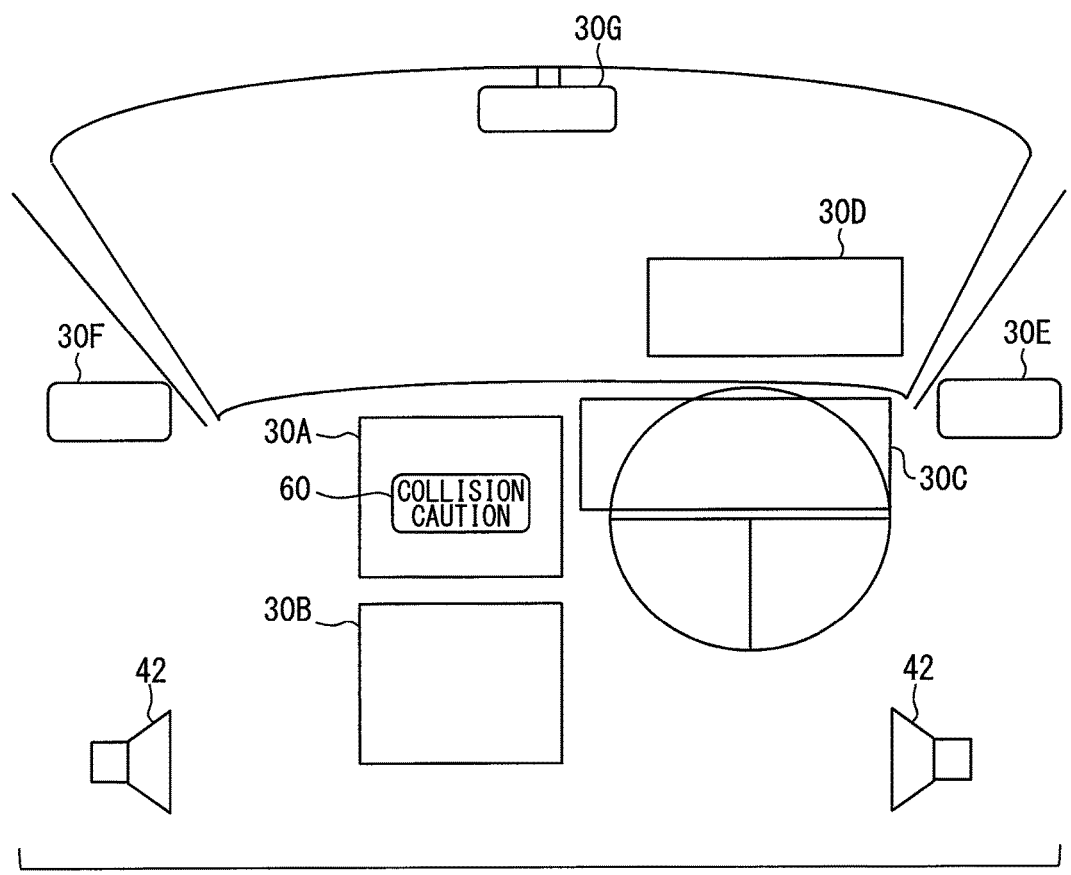
FIG. 5 is a diagram illustrating a display example of the display devices when executing step S30 in FIG. 3.

In step S20, the display device 30 located in the watching direction of the driver is identified with the use of the signal from the watch region determination unit 53. In step S30, the alert image 60 is erased from each of the display devices 30 other than the display device 30 identified in step S20. FIG. 5 illustrates a display example when step S30 is executed. In the example of FIG. 5, the alert image 60 is displayed only on the display device 30A.

In step S40, an avoidance operation is determined. The avoidance operation is a driving operation performed by the driver for dealing with a situation in which the target object detection unit 25 of the surrounding monitoring device 20 determines that the driver is to be alerted to the target object. The avoidance operation is determined on the basis of a distance between the target object and the subject vehicle, a direction difference between a traveling direction of the subject vehicle and a direction pointing from the subject vehicle toward the target object, or a relative speed between the subject vehicle and the target object. For example, the avoidance operation may be a braking operation or steering operation.

In step S50, the alert image 60 is moved in a target object display direction by a predetermined movement amount. The target object display direction is a direction pointing from the display device 30 on which the alert image 60 is remained toward the region in which the above-mentioned alert target object is displayed in another display device 30. The region in which the alert target object is displayed is a partial area of the display surface of the display device 30 which displays the alert target object.

Since the alert target object is an object detected by the surrounding monitoring device 20, the target object display direction is determined on the basis of the direction of the object detected by the surrounding monitoring device 20. The predetermined movement amount is a movement amount is set so that the driver who watches the alert image

60 is capable of following a movement of the alert image 60 without losing sight of the alert image 60.

A specific example of the display device 30 on which the alert target object is displayed will be described. For example, when the alert target object is present in front of the subject vehicle, the alert target object is displayed on the display device 30D. When the alert target object is present on the right side of the subject vehicle, the alert target object is displayed on the display device 30E. When the alert target object is present on the left side of the subject vehicle, the alert target object is displayed on the display device 30F. When the alert target object is present on the rear side of the subject vehicle, the alert target object is displayed on the display device 30G. The above configurations are examples, and a relationship between the direction along which the alert target object is present and the display devices 30 on which the alert target object is displayed is not limited to the above examples.

In step S60, the electric signal indicative of the audio operation guide for guiding the avoidance operation determined in step S40 in audio manner is output to the amplifier 41. As a result, the audio operation guide is output from the speaker 42.

In step S70, it is determined whether the alert event has been coped with or not. When the target object detection signal is no longer input from the surrounding monitoring device 20, it is determined that the alert event has been properly coped with. When it is determined that the alert event has not been coped with (S70: NO), the process proceeds to step S80.

In step S80, it is determined whether the movement of the alert image 60 has been completed or not. That is, it is determined whether the display position of the alert image 60 has reached the position at which the alert target object is displayed. When negative determination is made, the process returns to step S50, and when positive determination is made, the process returns to step S60. Therefore, until the movement of the alert image 60 to the display position of the alert target object is completed, the alert image 60 is repeatedly moved in the display direction of the alert target object by the predetermined movement amount, and the audio operation guide is repeatedly output from the speaker 42. When the movement of the alert image 60 is completed, the alert image 60 is displayed at the same position with the alert target object, and the audio operation guide voice is output from the speaker 42.

Figure 6:
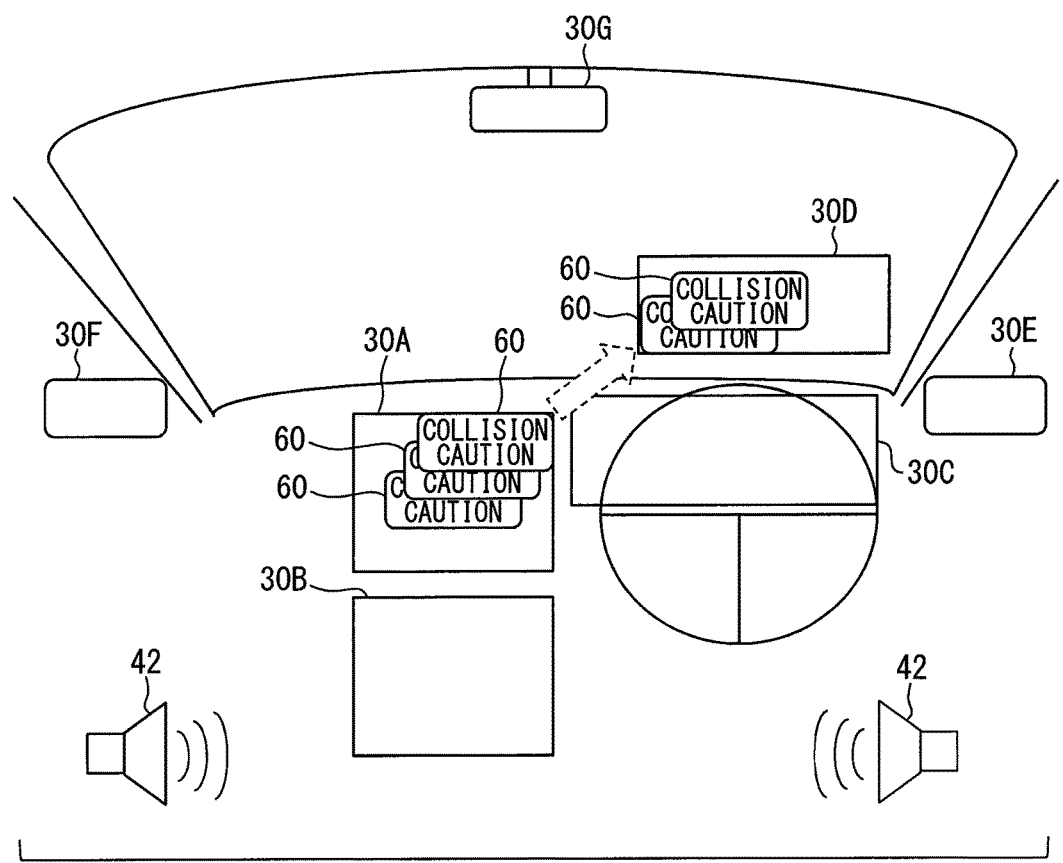
FIG. 6 is a diagram illustrating a display example of the display devices while repeating steps S50 to S80 in FIG. 3.

FIG. 6 conceptually illustrates a change in the position of the alert image 60 while steps S60 to S80 are repeated. In an example illustrated in FIG. 6, the alert image 60 is moved from the display surface of the display device 30A in the direction of the display device 30D by multiple times, and the alert image 60 is moved to a position closest to the display device 30D on the display surface of the display device 30A. The movement direction represents the target object display direction.

The alert image 60 is moved to the position closest to the display device 30D on the display surface of the display device 30A. When the driver watches the movement, the driver feels that the alert image 60 further moves in a direction indicated by a broken arrow. Then, the alert image 60 moves to the position closest to the display device 30A on the display surface of the display device 30D. Thereafter, the alert image 60 further moves in the target object display direction toward the alert target object.

When the alert event is coped with during repeated execution of steps S60 to S80, the determination in step S70 becomes positive, and the process proceeds to step S90. In step S90, the alert image 60 is erased from the display device 30.

Advantages Provided by First Embodiment

In the first embodiment, when the surrounding monitoring device 20 detects the target object around the subject vehicle, and determines that the driver is to be alerted to the target object, the processing result output unit 56 of the alert control device 50 identifies the display device 30 for displaying the alert image 60.

In identifying the display device 30 for displaying the alert image 60, the watch region determination unit 53 determines which display device 30 is located in the watching direction of the driver. The processing result output unit 56 displays the alert image 60 on the display device 30 located in the watching direction of the driver, which is determined by the watch region determination unit 53.

As described above, since the display device 30 for displaying the alert image 60 is set to the display device 30 watched by the driver, in other words, the display device 30 that is located in the sight line direction of the driver, the driver is more likely to be aware of the alert image 60.

Furthermore, after the alert image 60 is displayed on the display device 30 located in the sight line direction of the driver, the processing result output unit 56 successively moves the alert image 60 to the region in which an alert target object detected by the surrounding monitoring device 20 is displayed (S50, S80). With the movement of the alert image 60, there is a high possibility that the sight line of the driver also moves in a direction along which the alert image 60 moves. Therefore, the driver can promptly recognize the situation required to be recognized by the driver.

In the first embodiment, before the alert image 60 is displayed on the display device 30 located in the direction of the line of sight of the driver, the alert image 60 is displayed on all of the display devices 30A to 30G (S10). With that configuration, the driver can clearly recognize an occurrence of a situation required to be alerted.

In addition, with the execution of step S10, a period of time after the target object detection signal has been input from the surrounding monitoring device 20 until the watch region determination unit 53 determines which display device 30 is located in the direction along which the driver watches can be ensured. Therefore, the watch region determination unit 53 can spend enough time on calculation having large calculation amount, and can determine which display device 30 is located in the watching direction of the driver with high precision. In addition, since the watch region determination unit 53 has plenty of time for determination of the watching direction of the driver, the watching direction of the driver can be determined with the use of a low cost computer having a low calculation speed.

In the first embodiment, the driving operation for coping with the alerted situation is guided by audio guidance in addition to the alert image 60 displayed on the display device 30 (S60). As a result, the driver can promptly perform the driving operation properly for coping with the alerted situation.

Second Embodiment

The following will describe a second embodiment of the present disclosure. In the second embodiment and the subsequent embodiments, elements having symbols of the same numbers as those of the symbols used up to now are identical with the elements having the same symbols in the previous embodiment except as otherwise stated. When only a part of a configuration is described, the embodiment described previously can be applied to the other parts of the configuration.

Figure 7:
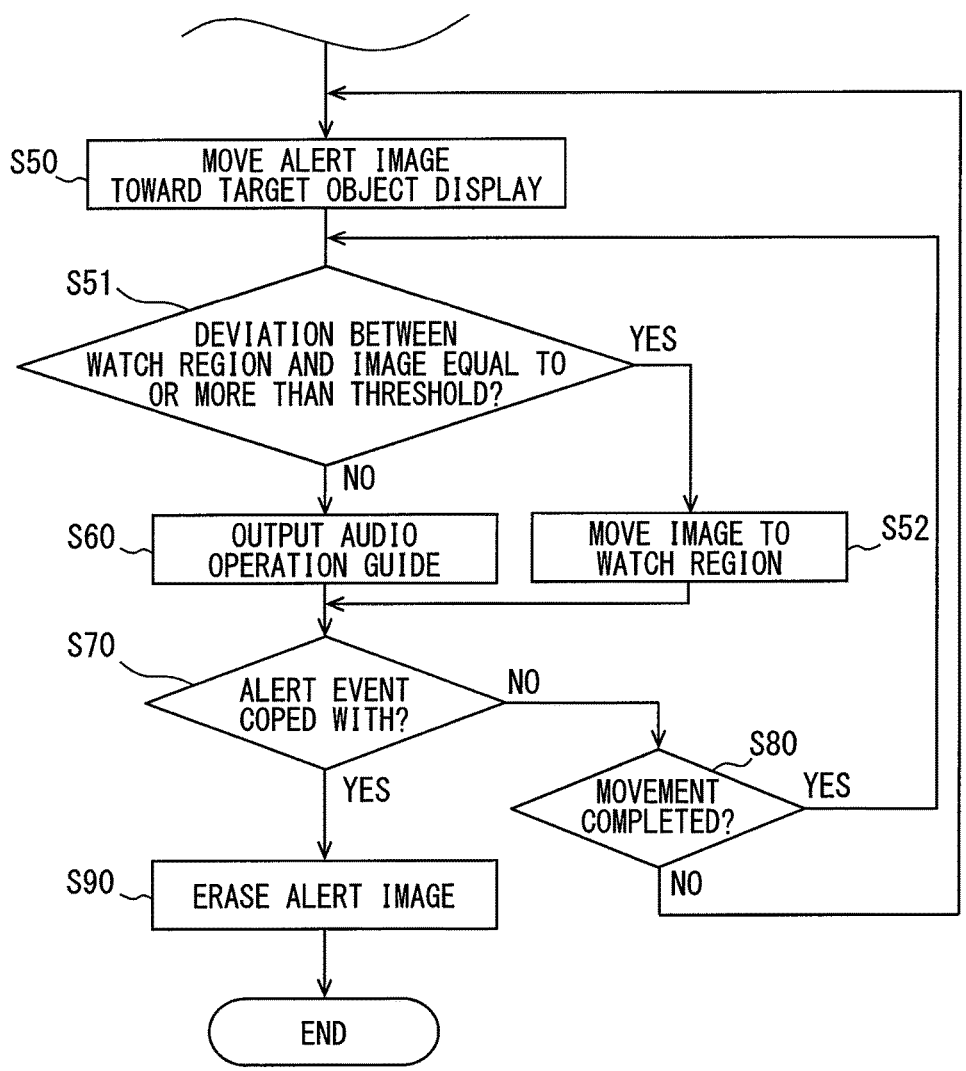
FIG. 7 is a flowchart illustrating a part of process executed by a processing result output unit of an alert control device according to a second embodiment of the present disclosure.

In the second embodiment, the processing result output unit 56 of the alert control device 50 executes a process illustrated in FIG. 7 instead of the process illustrated in FIG. 3. In FIG. 7, process before step S50 is identical with that in FIG. 3, and the illustration of the prior process is omitted. In the process shown in FIG. 7, steps S51 and S52 are added to the process of FIG. 3. The rest of process is identical with that in FIG. 3.

In step S51, it is determined whether a deviation between the watch region of the driver and the display region in which an alert image 60 is displayed on a display device 30 is equal to or more than a threshold or not. The watch region of the driver is a region that can be determined with the sight line of the driver as a center on a plane including the display surface of the display device 30 on which the alert image 60 is displayed. The watch region of the driver can be recognized by a central visual field of the driver. The deviation and the threshold may be expressed by a distance on the plane. The sight line detection device 10 successively performs the sight line detection of the driver while the process of FIG. 7 is executed by the processing result output unit 56, and successively inputs the signal indicative of the sight line to the first data input unit 51.

When the determination in step S51 is negative, the process proceeds to step S60, and when the determination is positive, the process proceeds to step S52. In step S52, the alert image 60 is moved to the latest watch region determined on the basis of the latest sight line detected by the sight line detection device 10. Thereafter, the control proceeds to step S70.

Advantages of Second Embodiment

In the second embodiment, it is determined whether the deviation between the watch region of the driver and the alert image 60 is equal to or more than the threshold during the movement of the alert image 60 (S51). When it is determined that the deviation is equal to or more than the threshold (S51: YES), the alert image 60 is moved to the watch region of the driver (S52). Therefore, the sight line of the driver can be promptly led to the region in which the alert target object is displayed even if the driver takes his eyes away from the alert image 60 during the movement of the alert image 60 for obtaining the forward area situation.

It is noted that a flowchart or the processing of the flowchart in the present disclosure includes sections (also referred to as steps), each of which is represented, for instance, as S10. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

The embodiments of the present disclosure have been described as above. However, the present disclosure is not limited to the above-described embodiments, and the following modifications also fall within the technical scope of the present disclosure. Further, the present disclosure can be implemented with various changes without departing from the spirit of the present disclosure, aside from the following modifications.

(First Modification)

For example, in the embodiments described above, all of the display devices 30A to 30G are set as the initial display devices. Alternatively, the initial display devices may be a part of the multiple display devices 30A to 30G under a condition that multiple display devices are set as the initial display devices. When the alert image 60 is displayed on the multiple display devices 30, the driver can easily be aware of that the alert image 60 is displayed on the display devices.

(Second Modification)

Second modification represents a specific example in which parts of the display devices 30A to 30G are set as the initial display devices. For example, at least four display devices 30 that are part of the display devices 30A to 30G, and disposed within a central visual field of the driver when the sight line of the driver faces each of a front upward direction, a front downward direction, a front right direction, and a front left direction are set as the initial display devices. The display devices 30 disposed within a central visual field of the driver when the sight line of the driver faces each of the front upward direction, the front downward direction, the front right direction, and the front left direction are, for example, the display devices 30G, 30A, 30E, and 30F, respectively.

(Third Modification)

Third modification represents a specific example in which parts of the display devices 30A to 30G are set as the initial display devices. For example, the initial display devices may be configured by multiple display devices 30 determined on the basis of the sight line of the driver detected by the sight line detection device 10. Herein, the multiple display devices are a part of the display devices 30A to 30G. For example, the viewing field of the driver is determined on the basis of the sight line, and the display devices 30 of a predetermined number smaller than the number of all the display devices among the display devices 30 included in the viewing field are set as the initial display devices. A criterion for selecting the predetermined number of display devices 30 from the display devices 30 included in the viewing field is set as, for example, an order of distance to the sight line.

Meanwhile, in the third modification, in the sight line detection device 10, the precision is deteriorated until a need to display the alert image 60 occurs, but if the sight line is detected by a technique in which the calculation amount is small, and the sight line can be promptly determined, the initial display devices can be promptly determined. When the processing result output unit 56 of the alert control device 50 puts into a state to execute step S20 and subsequent steps of FIG. 3, the calculation amount is large, and a period of time till the sight line detection becomes relatively long, but the sight line detection may be performed by a technique high in precision.

(Fourth Modification)

In the above-mentioned embodiments and modifications, the surrounding monitoring device 20 determines whether to alert the driver to the target object or not. Alternatively, the determination may be performed by the alert control device 50.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A vehicle-mounted alert system comprising:
a plurality of display devices equipped to a vehicle;
a sight line detection device detecting a sight line of a driver of the vehicle;
a surrounding monitoring device detecting a presence of an object near the vehicle and a direction of the object with respect to the vehicle; and
an alert control device controlling the plurality of display devices to display an alert image for informing the driver of the presence of the object detected by the surrounding monitoring device, wherein
the alert control device sets two or more of the plurality of display devices as initial display devices and displays the alert image on each of the initial display devices, and then, the alert control device controls only one of the plurality of display devices which is located in a direction of the sight line of the driver detected by the sight line detection device to display the alert image and erases the alert image from another ones of the plurality of display devices, and then, the alert control device controls the plurality of display devices so that the alert image successively moves from the one of the plurality of display devices which is located in the direction of the sight line of the driver to the another one of the plurality of display devices which is determined based on the direction of the object detected by the surrounding monitoring device.

2. The vehicle-mounted alert system according to claim 1, wherein
the initial display devices include a part of the plurality of display devices which are located within a central visual field of the driver when the direction of the sight line of the driver points a front upward direction, a front downward direction, a front right direction, or a front left direction.

3. The vehicle-mounted alert system according to claim 1, wherein
the initial display devices are defined based on the sight line of the driver which is detected by the sight line detection device.

4. The vehicle-mounted alert system according to claim 1, wherein
the alert control device controls a speaker equipped to the vehicle to output a sound indicating a driving operation for coping with a situation notified by the alert image in addition to a display of the alert image on the plurality of display devices.

5. The vehicle-mounted alert system according to claim 1, wherein
the sight line detection device successively detects the sight line of the driver while the alert control device controls the plurality of devices to display the alert image, and,
during a successive movement of the alert image among the plurality of display devices, when a deviation between a watch region determined based on the sight line of the driver which is successively detected by the sight line detection device and a display region in which the alert image is displayed is equal to or greater than a threshold, the alert control device changes the display region in which the alert image is to be displayed to a watch region determined based on a latest sight line of the driver which is detected by the sight line detection device, and the alert control device successively moves the alert image from the display device determined based on the display region that is changed to the display device determined based on the direction of the object detected by the surrounding monitoring device.

6. The vehicle-mounted alert system according to claim 1, wherein,
after the alert image is displayed on the another one of the plurality of display devices, the alert control device erases the alert image from the another one of the plurality of display devices when the situation notified by the alert image to the driver is coped with.

7. An alert control device, wherein the alert control device is used in a vehicle-mounted alert system which includes:
a plurality of display devices equipped to a vehicle;
a sight line detection device detecting a sight line of a driver of the vehicle; and
a surrounding monitoring device detecting a presence of an object near the vehicle and a direction of the object with respect to the vehicle,
the alert control device comprising:
an alert image creation unit creating an alert image that informs the driver of the presence of the object detected by the surrounding monitoring device; and
a processing result output unit controlling the alert image to be displayed on the plurality of display devices, wherein
the processing result output unit sets two or more of the plurality of display devices as initial display devices and displays the alert image on each of the initial display devices, and then, the processing result output unit controls only one of the plurality of display devices which is located in a direction of the sight line of the driver detected by the sight line detection device to display the alert image and erases the alert image from another ones of the plurality of display devices, and then, the processing result output unit controls the plurality of display devices so that the alert image successively moves from the one of the plurality of display devices which is located in the direction of the sight line of the driver to the another one of the plurality of display devices which is determined based on the direction of the object detected by the surrounding monitoring device.

8. A vehicle-mounted alert system comprising:
a plurality of display devices equipped to a vehicle;
a sight line detection device detecting a sight line of a driver of the vehicle;
a surrounding monitoring device detecting a presence of an object near the vehicle and a direction of the object with respect to the vehicle; and
an alert control device controlling the plurality of display devices to display an alert image for informing the driver of the presence of the object detected by the surrounding monitoring device, wherein
the alert control device sets two or more of the plurality of display devices as initial display devices and displays the alert image on each of the initial display devices, and then, the alert control device controls one of the plurality of display devices which is located in a direction of the sight line of the driver detected by the sight line detection device to display the alert image, and then, the alert control device controls the plurality of display devices so that the alert image successively moves from the one of the plurality of display devices which is located in the direction of the sight line of the driver to another one of the plurality of display devices which is determined based on the direction of the object detected by the surrounding monitoring device, the sight line detection device successively detects the sight line of the driver while the alert control device controls the plurality of devices to display the alert image, and during a successive movement of the alert image among the plurality of display devices, when a deviation between a watch region determined based on the sight line of the driver which is successively detected by the sight line detection device and a display region in which the alert image is displayed is equal to or greater than a threshold, the alert control device changes the display region in which the alert image is to be displayed to a watch region determined based on a latest sight line of the driver which is detected by the sight line detection device, and the alert control device successively moves the alert image from the display device determined based on the display region that is changed to the display device determined based on the direction of the object detected by the surrounding monitoring device.

9. The vehicle-mounted alert system according to claim 8, wherein the initial display devices include a part of the plurality of display devices which are located within a central visual field of the driver when the direction of the sight line of the driver points a front upward direction, a front downward direction, a front right direction, or a front left direction.

10. The vehicle-mounted alert system according to claim 8, wherein the initial display devices are defined based on the sight line of the driver which is detected by the sight line detection device.

11. The vehicle-mounted alert system according to claim 8, wherein the alert control device controls a speaker equipped to the vehicle to output a sound indicating a driving operation for coping with a situation notified by the alert image in addition to a display of the alert image on the plurality of display devices.

* * * * *